(12) United States Patent
Yuasa et al.

(10) Patent No.: US 8,487,631 B2
(45) Date of Patent: Jul. 16, 2013

(54) BATTERY MODULE

(75) Inventors: Shin-ichi Yuasa, Kyoto (JP); Jun Asakura, Osaka (JP)

(73) Assignee: Panasonic Corporation, Osaka (JP)

( * ) Notice: Subject to any disclaimer, the term of this patent is extended or adjusted under 35 U.S.C. 154(b) by 273 days.

(21) Appl. No.: 13/139,161

(22) PCT Filed: Dec. 6, 2010

(86) PCT No.: PCT/JP2010/007090
§ 371 (c)(1),
(2), (4) Date: Jun. 10, 2011

(87) PCT Pub. No.: WO2011/092782
PCT Pub. Date: Aug. 4, 2011

(65) Prior Publication Data
US 2012/0013340 A1    Jan. 19, 2012

(30) Foreign Application Priority Data
Jan. 28, 2010   (JP) ................................. 2010-016911

(51) Int. Cl.
*G01N 27/416* (2006.01)
*G01N 27/42* (2006.01)
*H02J 7/00* (2006.01)

(52) U.S. Cl.
USPC ............. 324/430; 429/90; 324/425; 324/426; 320/107; 320/112

(58) Field of Classification Search
None
See application file for complete search history.

(56) References Cited

U.S. PATENT DOCUMENTS

| | | | | |
|---|---|---|---|---|
| 2008/0286637 A1* | 11/2008 | Yusa et al. | ...................... | 429/99 |
| 2010/0092854 A1* | 4/2010 | Ha et al. | ........................ | 429/158 |
| 2012/0286793 A1* | 11/2012 | Kawaoka et al. | ............. | 324/426 |

FOREIGN PATENT DOCUMENTS

| | | |
|---|---|---|
| JP | 1-179357 | 12/1989 |
| JP | 2004-031255 | 1/2004 |
| JP | 2008-109841 | 5/2008 |
| JP | 2008-287992 | 11/2008 |
| WO | WO 2008/050953 A1 | 5/2008 |

* cited by examiner

*Primary Examiner* — Jermele M Hollington
*Assistant Examiner* — Trung Nguyen
(74) *Attorney, Agent, or Firm* — McDermott Will & Emery LLP (57) ABSTRACT

It is intended to provide a battery module having a long life by designing such that deterioration proceeds evenly among battery cells. Disclosed is a battery module including a plurality of battery groups being connected in series and each comprising a plurality of battery cells connected in parallel, wherein: a positive electrode terminal and a negative electrode terminal are provided; the battery groups are connected to each other by a plurality of electrically conductive strips; and an electrical resistance value of the conductive strip arranged at a position near a virtual line drawn between the positive electrode terminal and the negative electrode terminal is high, and an electrical resistance value of the conductive strip arranged at a position other than the position near the virtual line is low, the electrical resistance value being measured in a direction of charge and discharge current flow.

8 Claims, 7 Drawing Sheets

BATTERY MODULE

RELATED APPLICATIONS

This application is the U.S. National Phase under 35 U.S.C. §371 of International Application No. PCT/JP2010/007090, filed on Dec. 6, 2010, which in turn claims the benefit of Japanese Application No. 2010-016911, filed on Jan. 28, 2010, the disclosures of which Applications are incorporated by reference herein.

TECHNICAL FIELD

The present invention relates to a battery module comprising a plurality of battery groups being connected in series and each comprising a plurality of battery cells connected in parallel. More specifically, the present invention relates to a battery module formed by connecting battery groups by an improved method.

BACKGROUND ART

Batteries have started to be used as a power source for transportation equipment, machining equipment, power storage equipment and the like, in addition to be used as a driving power source for electric equipment and electronic equipment. The batteries used for transportation equipment, machining equipment, and power storage equipment are required to provide an instantaneous or continuous high output. A battery group formed by connecting a plurality of battery cells, or a battery module formed by further connecting these battery groups satisfies such a requirement.

For example, Patent Document 1 discloses a battery group comprising a plurality of battery cells connected in parallel, from which electric power is extracted through lead terminals. In this battery group, the connection resistance between a battery cell whose temperature tends to increase at a higher rate and the lead terminals is set larger than that between a battery cell whose temperature tends to increase at a lower rate and the lead terminals. Patent document 1 teaches that in the battery group comprising a plurality of battery cells connected in parallel, variations in capacity among the battery cells can be reduced by suppressing variations in temperature among the battery cells.

Patent Document 2 discloses a secondary battery system including: a secondary battery main body comprising battery modules connected in parallel, the battery modules each being formed by connecting a plurality of unit batteries; and a control unit for controlling the temperature of each battery module so that every battery module has the same internal electrical resistance.

Both of the techniques disclosed in Patent Documents 1 and 2 intend to suppress variations in temperature that might occur among the battery cells or among the battery modules.

RELATED ART DOCUMENTS

Patent Documents

Patent Document 1: Japanese Laid-Open Patent Publication No. 2004-31255
Patent Document 2: Japanese Laid-Open Patent Publication No. 2008-109841

SUMMARY OF THE INVENTION

Problem to be Solved by the Invention

In a battery module in which a plurality of battery cells are connected in parallel to form a battery group, and a plurality of the battery groups are further connected in series, the temperatures of the battery cells arranged in a specific region increase locally, which causes deterioration. The present inventors have understood this phenomenon as follows.

Figure 13:
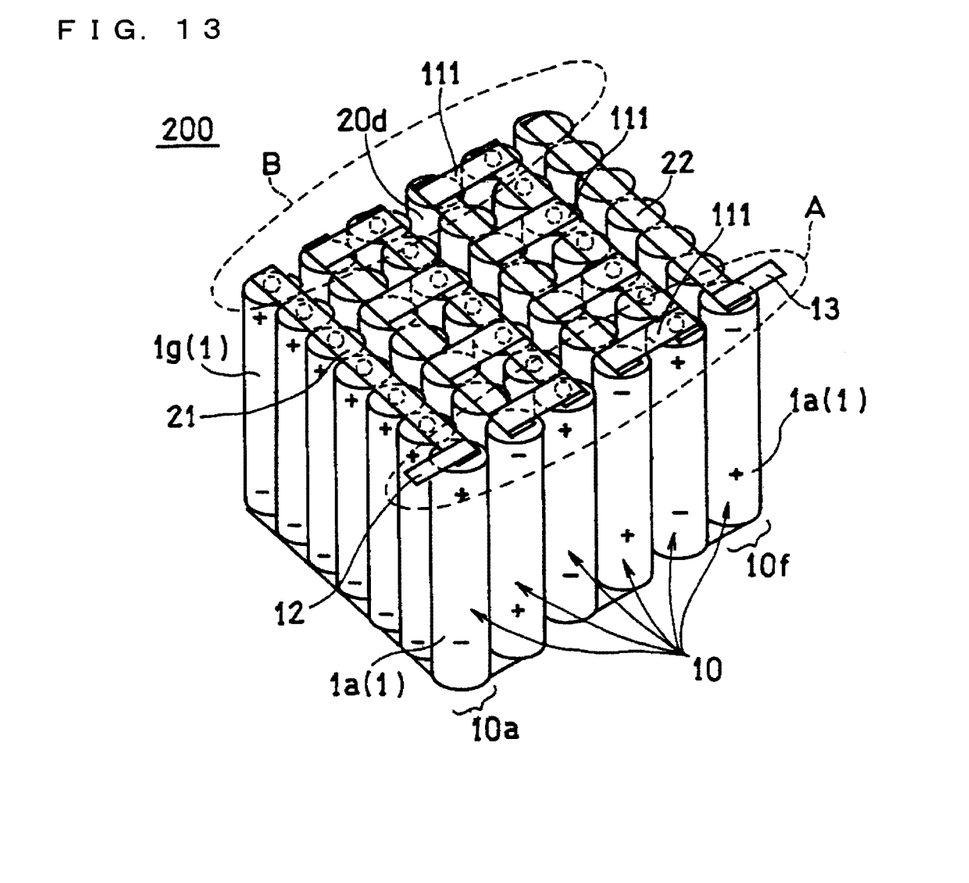
FIG. 13 A perspective schematic view of a battery module 200.

FIG. 13 is a schematic perspective view of a battery module 200 formed by aligning and connecting seven tubular battery cells 1 in parallel to form a battery group 10, and aligning and connecting six battery groups 10 in series. The positive electrodes (+) of the tubular battery cells 1 in each battery group 10 are connected to each other by a positive electrode current collector plate 21, and the negative electrodes (−) are connected to each other by a negative electrode current collector plate 22. The battery groups 10 are connected to each other in series by a plurality of conductive strips 111. A positive electrode lead (a positive electrode terminal) 12 is connected to the positive electrode current collector plate 21 in the vicinity of a battery group 10a, and a negative electrode lead (a negative electrode terminal) 13 is connected to the negative electrode current collector plate 22 in the vicinity of a battery group 10f.

In charging and discharging the battery module 200, the charge/discharge current tends to pass preferentially along the shortest distance (in the side A) between the positive electrode lead 12 and the negative electrode lead 13. On the other hand, in the region away from the shortest distance between the positive electrode lead 12 and the negative electrode lead 13, for example, in the side B, there is a tendency that the charge/discharge current is relatively difficult to flow.

As such, among the tubular battery cells 1, the temperature of a battery at a position close to the shortest distance between the positive electrode lead 12 and the negative electrode lead 13, for example, a tubular battery cell 1a, is more likely to increase locally because the charge/discharge current flows preferentially therethrough. On the other hand, the temperature of a battery at a position away from the shortest distance between the positive electrode lead 12 and the negative electrode lead 13, for example, a tubular battery cell 1g, is less likely to increase because the charge/discharge current is relatively difficult to pass therethrough. Because of the local increase in temperature, the tubular battery cell 1a deteriorates relatively earlier. On the other hand, in the tubular battery cell 1g, increase in temperature is comparatively less likely to occur.

If there occurs a difference in the degree of deterioration among the tubular battery cells, the electrical resistance of the deteriorated tubular battery cell becomes high, and the amount of Joule heat generated is further increased. As a result, the deterioration of the tubular battery cell whose deterioration has started earlier is accelerated. The life of the battery module is influenced by a tubular battery cell whose life is short among the tubular battery cells. Therefore, when the life of a certain tubular battery cell expires, the life of the battery module expires even though the other tubular battery cells are in good condition.

The present invention intends to provide a battery module having a long life by reducing variations in the progress of deterioration among the battery cells constituting the battery module.

Means for Solving the Problem

One aspect of the present invention is a battery module including a plurality of battery groups being connected in series and each comprising a plurality of battery cells connected in parallel, wherein: a positive electrode terminal and a negative electrode terminal are provided; the battery groups are connected to each other by a plurality of electrically conductive strips; and an electrical resistance value of the conductive strip arranged at a position near a virtual line drawn between the positive electrode terminal and the negative electrode terminal is high, and an electrical resistance value of the conductive strip arranged at a position other than the position near the virtual line is low, the electrical resistance value being measured in a direction of charge and discharge current flow.

The foregoing and other objects, features, aspects, and advantages of the present invention will be more apparent from the following detailed description and the accompanying drawings.

Effect of the Invention

The battery module of the present invention has a longer life because deterioration proceeds evenly among the battery cells.

BEST MODE FOR CARRYING OUT THE INVENTION

First Embodiment

Figure 1:
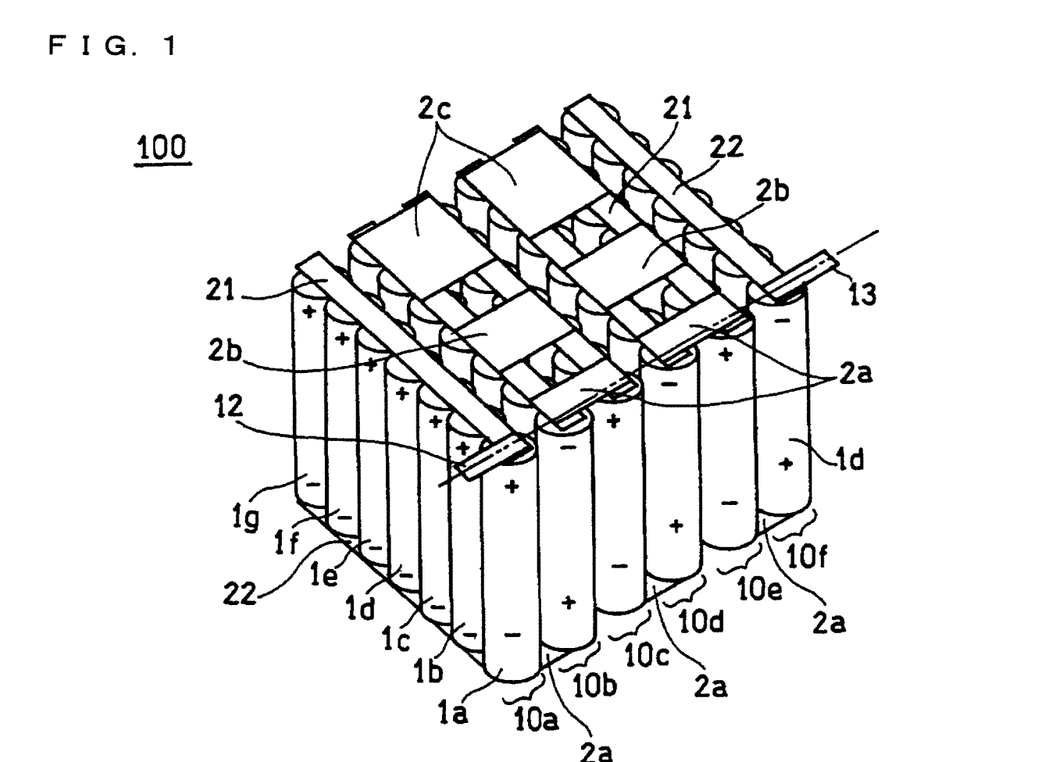
FIG. 1 A perspective schematic view of a battery module 100 of First Embodiment.
Figure 2:
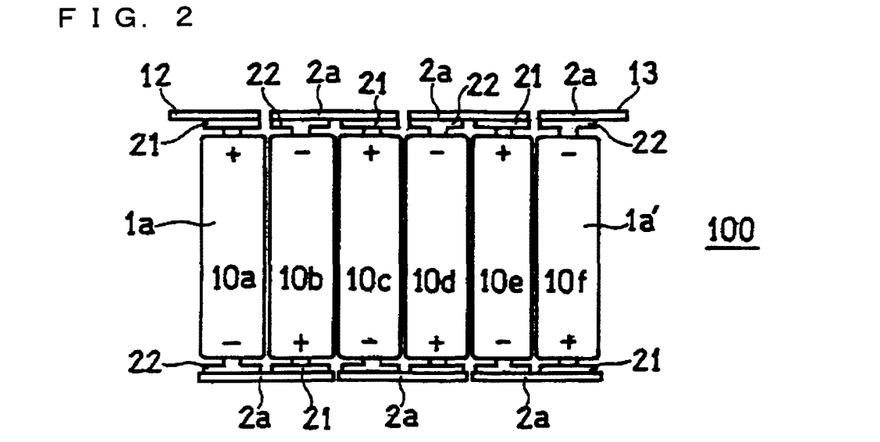
FIG. 2 A side schematic view of the battery module 100.
Figure 3:
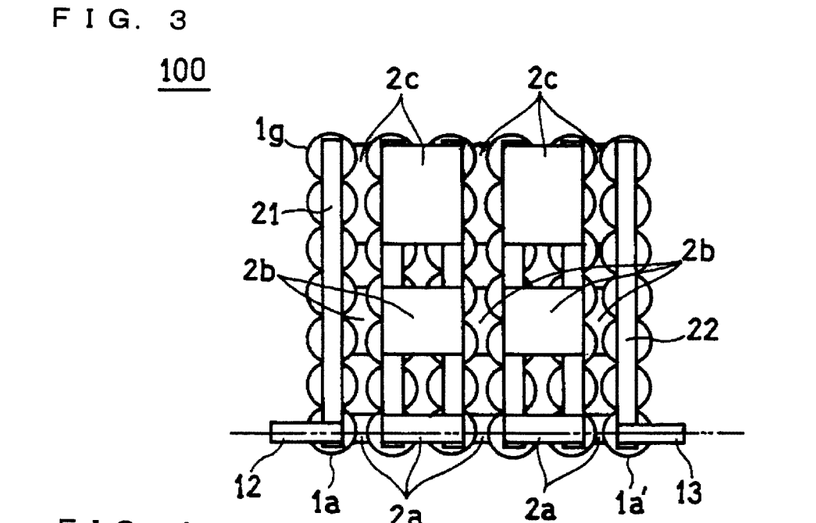
FIG. 3 A top schematic view of the battery module 100.
Figure 4:
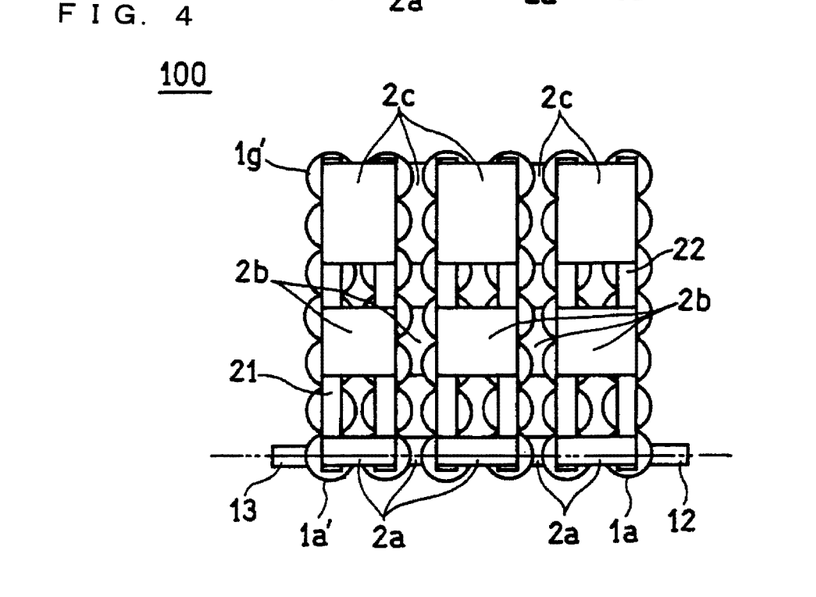
FIG. 4 A bottom schematic view of the battery module 100.

FIG. 1 is a perspective schematic view showing the configuration of a battery module 100 according to First Embodiment of the present invention. FIG. 2 is a front side schematic view of the battery module 100, FIG. 3 is a top view of the battery module 100, and FIG. 4 is a bottom view of the battery module 100.

The battery module 100 is a battery module formed by connecting six battery groups 10 (10a, 10b, 10c, 10d, 10e and 10f) in series by a plurality of electrically conductive strips 2 (2a, 2b and 2c).

Each of the battery groups 10 comprises linearly arranged seven tubular battery cells 1 (1a, 1b, 1c, 1d, 1e, 1f, and 1g) connected in parallel by a positive electrode current collector plate 21 and a negative electrode current collector plate 22.

The tubular battery cell 1 is a cylindrical battery having a positive electrode (+) at one end thereof in the longitudinal direction and a negative electrode (−) at the other end thereof. The battery groups 10 are linearly aligned upright with the positive electrodes (+) of the seven tubular battery cells 1 being arranged in the same side and the negative electrodes (−) being arranged in the same side. Arranging the tubular battery cells 1 in such a manner is preferable because it can make the battery module more compact. Preferably, the linearly arranged tubular battery cells 1 are securely positioned by being laminated or mounted on a frame.

The positive electrodes (+) of the seven tubular battery cells 1 of the battery group 10 are connected to each other by the positive electrode current collector plate 21, and the negative electrodes (−) are connected to each other by the negative electrode current collector plate 22. The connection is made by, for example, welding. The positive electrode current collector plate 21 and the negative electrode current collector plate 22 are formed of an electrically conductive material. The conductive material may be, for example, a metal material such as stainless steel, titanium, aluminum, an aluminum alloy, nickel, copper, or a copper alloy.

The tubular battery cell 1 may be either a secondary battery or a primary battery. Examples of the secondary battery include lithium ion secondary batteries, nickel-metal hydride secondary batteries, alkaline secondary storage batteries, lead storage batteries, and nickel-cadmium secondary batteries. Examples of the primary battery include manganese dry batteries, alkaline dry batteries, lithium primary batteries, and silver oxide batteries. Among these, secondary batteries, particularly lithium ion secondary batteries, are preferred.

As shown in FIG. 2, the battery groups 10a to 10f are arranged such that the positive electrodes (+) are alternated with the negative electrodes (−). This eases the series connection of the battery groups 10a to 10f by the conductive strips. Further, this can make the conductive strip smaller in size. As a result, the outer dimensions of the battery module 100 can be reduced. This can increase the variety of the devices for which the battery module 100 can be applied as a power source.

In each figure, the column of the battery group 10a is referred to as the first column, and the column of the battery group 10f is referred to as the sixth column. The line including the tubular battery cell 1a is referred to as the first line, and the line including the tubular battery cell 1g is referred to as the sixth line. As shown in FIGS. 1 and 2, in the battery groups 10a, 10c and 10e of the first, third and fifth columns, the positive electrode current collector plates 21 are positioned at the top, and the negative electrode current collector plates 22 are positioned at the bottom. In the battery groups 10b, 10d and 10f at the second, forth and sixth columns, the positive electrode current collector plates 21 are positioned at the bottom, and the negative electrode current collector plates 22 are positioned at the top.

The positive electrode lead (positive electrode terminal) 12 is connected to the positive electrode current collector plate 21 at a position near the tubular battery cell 1a in the first line of the first column of the battery group 10a, which is the end on the positive electrode side. This makes the current path from the positive electrode lead 12 to the tubular battery cell 1a shorter than any other current path from the positive electrode lead 12 to the tubular battery cell. The negative electrode lead (negative electrode terminal) 13 is connected to the negative electrode current collector plate 22 at a position near a tubular battery cell 1a' in the first line of the sixth column of the battery group 10f, which is the end on the negative electrode side. This makes the current path from the negative electrode lead 13 to the tubular battery cell 1a' shorter than any other current path from the negative electrode lead 13 to the tubular battery cell.

The positive electrode lead 12 or the negative electrode lead 13 is formed of an electrically conductive material. The conductive material may be, for example, a metal material such as aluminum, an aluminum alloy, stainless steel, titanium, iron, nickel, copper, or a copper alloy.

As shown in FIGS. 1 to 4, the adjacent battery groups 10 are connected to each other in series by connecting the positive electrode current collector plates 21 to the negative electrode current collector plates 22 by a plurality of conductive strips 2a, 2b and 2c. The conductive strip is a metal strip formed of an electrically conductive material. The conductive material may be, for example, stainless steel, iron, titanium, aluminum, an aluminum alloy, nickel, copper, a copper alloy, or an electrically conductive resin.

In the battery module 100, the adjacent positive and negative electrode current collector plates 21 and 22 are connected to each other by three types of conductive strips 2a, 2b and 2c which are identical in the thickness and different in the width measured on a plane perpendicular to the direction of current flow. With regard to the area of the conductive strip when viewed from the top and the width of the conductive strip measured on a plane orthogonal to the direction of current flow, those of the conductive strip 2a are the smallest, and those of the conductive strip 2c are the largest. As such, the electrical resistance between the positive electrode current collector plate 21 and the negative electrode current collector plate 22 becomes highest in the path on which the conductive strip 2a is arranged, and lowest in the path on which the conductive strip 2c is arranged.

The dot-dash line shown in FIGS. 1, 3 and 4 is a virtual line drawn between the positive electrode lead 12 and the negative electrode lead 13. The shortest path of current in the battery module 100 is a current path along the virtual line. In the battery module 100, arranged on a path close to the virtual line are the conductive strips 2a whose contact area with the positive electrode current collector plate 21 and the negative electrode current collector plate 22 is the smallest and whose cross-sectional area measured on a plane orthogonal to the direction of current flow is the smallest. Arranged on a path farthest away from the virtual line are the conductive strips 2c whose contact area with the positive electrode current collector plate 21 and the negative electrode current collector plate 22 is the largest and whose cross-sectional area measured on a plane orthogonal to the direction of current flow is the largest. Arranged on a path therebetween are the conductive strips 2b whose contact area and cross-sectional area measured on a plane orthogonal to the direction of current flow are medium.

Current to flow from a positive electrode lead to a negative electrode lead is more likely to flow in a shorter path therebetween. Specifically, current has a tendency to flow more in a path close to the virtual line drawn between the positive electrode lead and the negative electrode lead. In the battery module 100, the conductive strips 2a whose contact area with the positive electrode current collector plate 21 and the negative electrode current collector plate 22 and whose cross-sectional area measured on a plane orthogonal to the direction of current flow are the smallest are arranged on a path close to the virtual line, so that the electrical resistance of the path close to the virtual line becomes higher than that of any other path. This prevents too much current from flowing in the path close to the virtual line. In addition, in the battery module 100, the farther the path is away from the virtual line, the larger the contact area and the cross-sectional area measured on a plane orthogonal to the direction of current flow of the current strips 2 are. By increasing the contact area and the cross-sectional area measured on a plane orthogonal to the direction of current flow of the conductive strips 2 as the conductive strips 2 are farther away from the virtual line, thereby to reduce the electrical resistance value accordingly, more current is allowed to flow in a path away from the virtual line, along which current would otherwise be difficult to flow. As a result, current flows evenly through a plurality of the tubular battery cells 1, load is evenly applied to all the tubular battery cells 1, and variations in battery life among the tubular battery cells 1 are reduced. Therefore, the battery module 100 can have a longer life.

The conductive strip 2 may be connected to the positive electrode current collector plate 21 or the negative electrode current collector plate 22 by any method without particular limitation. Examples of the method include welding, bonding using a conductive adhesive, and joining using a joint part such as a screw. Alternatively, the connection may be achieved by forming a recess at a predetermined position on the surface of the positive electrode current collector plate 21 or the negative electrode current collector plate 22, and fitting the conductive strip 2 into the recess.

The battery module 1 is usually accommodated into a housing made of a resin material, a rubber material, a ceramics material, or a metal material, a package of laminate sheet, or the like.

Although the battery group 10 is composed of seven tubular battery cells, the number of the tubular battery cells is not limited to seven and may be adjusted as appropriate according to the intended use thereof. Further, although six battery groups are connected in series in the battery module 100, the number of the battery groups is not limited to six and may be adjusted as appropriate according to the intended use thereof. Furthermore, although the battery cell 1 is a tubular battery cell of a cylindrical shape, the battery cell 1 may be of any shape without particular limitation and may be a prismatic battery or a flat battery.

Although the battery groups 1 are arranged such that the positive electrode current collector plates 21 are alternated with the negative electrode current collector plates 22 in the battery module 100, this is not a limitation. For example, the battery groups 1 may be arranged such that the positive electrode current collector plates 21 are arranged in the same side and the negative electrode current collector plates 22 are arranged in the same side.

Second Embodiment

Figure 5:
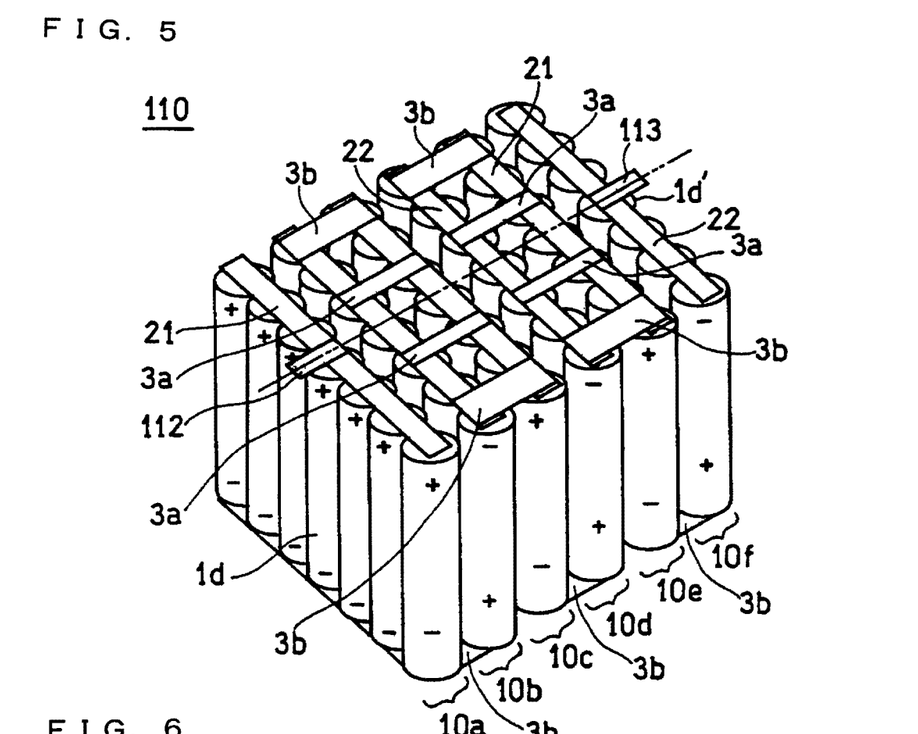
FIG. 5 A perspective schematic view of a battery module 110 of Second Embodiment.
Figure 6:
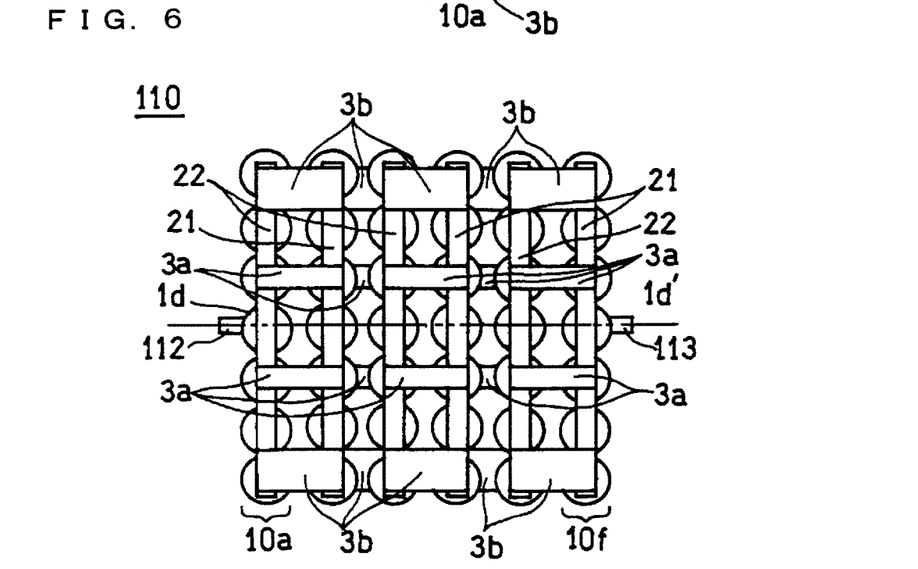
FIG. 6 A bottom schematic view of the battery module 110.

A battery module 110, which is another embodiment of the battery module according to the present invention, is described with reference to FIGS. 5 and 6. FIG. 5 is a perspective schematic view showing the configuration of the battery module 110. FIG. 6 is a bottom schematic view of the battery module 110. Here, the same component elements as those described with reference to FIGS. 1 to 4 in First Embodiment are denoted by the same reference numerals.

The battery module 110 is the same as the battery module 100, except that the connecting positions of the positive electrode lead and the negative electrode lead are changed, and the type of conductive strip is changed.

In the battery module 110, a positive electrode lead 112 is connected to the positive electrode current collector plate 21 at a position near the tubular battery cell 1d in the fourth line positioned at the center of the first column of battery group 10a, which is the end on the positive electrode side. This makes the current path from the positive electrode lead 112 to the tubular battery cell 1d shorter than any other current path from the positive electrode lead 112 to the tubular battery cell. A negative electrode lead 113 is connected to the negative electrode current collector plate 22 at a position near a tubular battery cell 1d' in the fourth line of the sixth column of the battery group 10f, which is the end on the negative electrode side. This makes the current path from the negative electrode lead 113 to the tubular battery cell 1d' shorter than any other current path from the negative electrode lead 113 to the tubular battery cell.

As shown in FIGS. 5 and 6, the adjacent battery groups 10 are connected to each other in series by connecting the positive electrode current collector plate 21 to the negative electrode current collector plate 22 by a plurality of conductive strips 3a and 3b.

In the battery module 110, the adjacent positive and negative electrode current collector plates 21 and 22 are connected to each other by two types of conductive strips 3a and 3b which are identical in the thickness and different in the width measured on a plane orthogonal to the direction of current flow. The area when viewed from the top and the width measured on a plane orthogonal to the direction of current flow of the conductive strip 3a are smaller than those of the conductive strip 3b. As such, the electrical resistance of the path on which the conductive strip 3a is arranged becomes higher than that of the path on which the conductive strip 3b is arranged.

The dot-dash line shown in FIGS. 5 and 6 is a virtual line drawn between the positive electrode lead 112 and the negative electrode lead 113. In the battery module 110, the arrangement of the conductive strips 3a and 3b is symmetric about the virtual line. Arranged on a path closest to the virtual line are the conductive strips 3a whose contact area with the current collector plates is small and whose cross-sectional area measured on a plane orthogonal to the direction of current flow is small. Arranged on a path away from the virtual line are the conductive strips 3b whose contact area with the current collector plates is large and whose cross-sectional area measured on a plane orthogonal to the direction of current flow is large.

Current has a tendency to flow more in a path close to the virtual line shown in FIGS. 5 and 6. Accordingly, by arranging the conducive strips 3a on a path close to the virtual line, the electrical resistance of the path close to the virtual line becomes higher than that of any other path, preventing too much current from flowing therein. In the battery module 110, the conductive strips 3b are arranged on a path away from the virtual line. By arranging the conducive strips 3b whose contact area with the current collector plates is large and whose cross-sectional area measured on a plane orthogonal to the direction of current flow is large, on a path away from the virtual line, more current is allowed to flow in a path away from the virtual line, along which current would otherwise be difficult to flow. As a result, current flows evenly through a plurality of the tubular battery cells 1, load is evenly applied to all the tubular battery cells 1, and variations in battery life among the tubular battery cells 1 are reduced. Therefore, the battery module 110 can have a longer life.

Third Embodiment

Figure 7:
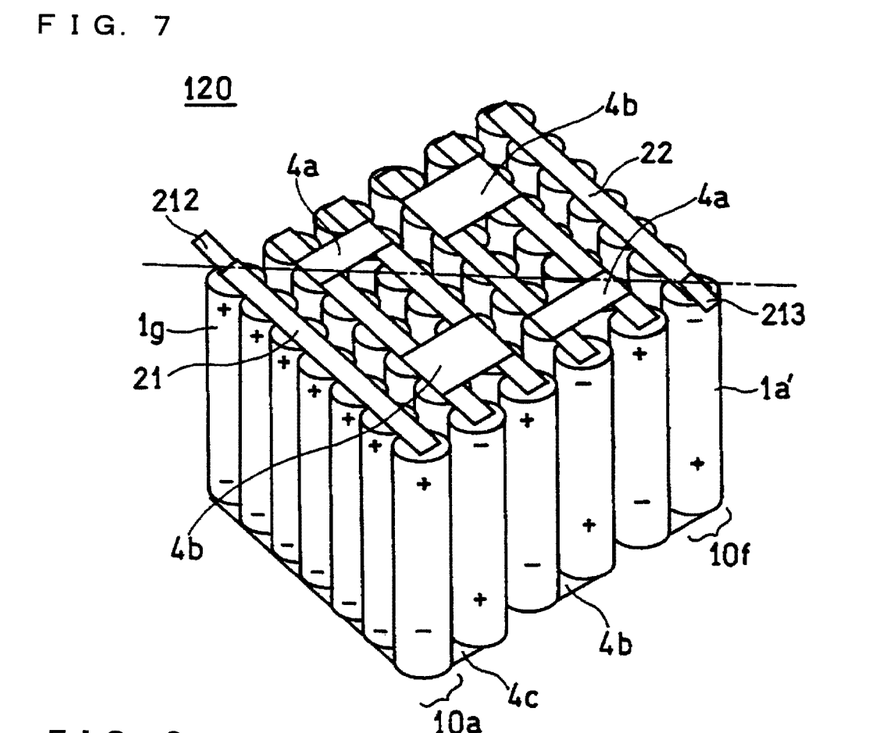
FIG. 7 A perspective schematic view of a battery module 120 of Third Embodiment.
Figure 8:
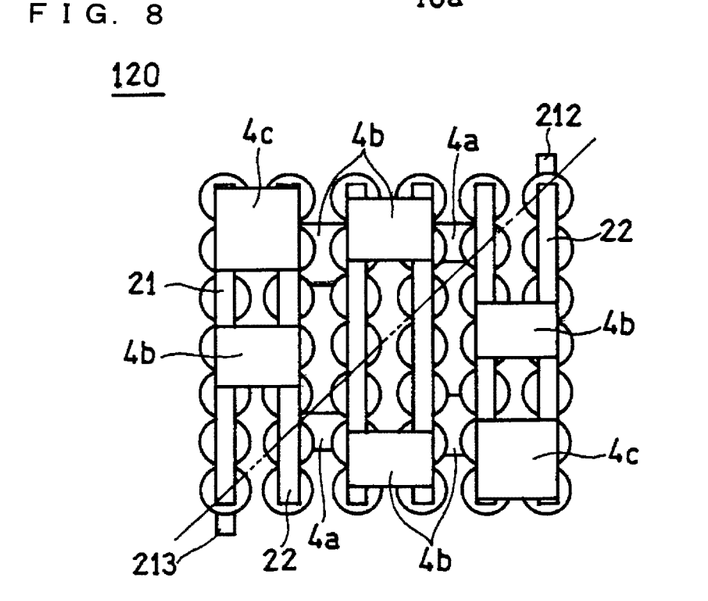
FIG. 8 A bottom schematic view of the battery module 120.

A battery module 120, which is yet another embodiment of the battery module according to the present invention, is described with reference to FIGS. 7 and 8. FIG. 7 is a perspective schematic view of the battery module 120, and FIG. 8 is a bottom schematic view of the battery module 120. Here, the same component elements as those described with reference to FIGS. 1 to 4 in First Embodiment are denoted by the same reference numerals.

The battery module 120 is the same as the battery module 100, except that the connecting positions of the positive electrode lead and the negative electrode lead are changed, and the type of conductive strip is changed.

In the battery module 120, a positive electrode lead 212 is connected to the positive electrode current collector plate 21 at a position near the tubular battery cell 1g in the seventh line positioned at the end of the first column of the battery group 10a, which is the end on the positive electrode side. This makes the current path from the positive electrode lead 212 to the tubular battery cell 1g shorter than any other current path from the positive electrode lead 212 to the tubular battery cell. A negative electrode lead 213 is connected to the negative electrode current collector plate 22 at a position near the tubular battery cell 1a' in the first line of the sixth column of the battery group 10f, which is the end on the negative electrode side. This makes the current path from the negative electrode lead 213 to the tubular battery cell 1a' shorter than any other current path from the negative electrode lead 213 to the tubular battery cell.

As shown in FIGS. 7 and 8, the adjacent battery groups 10 are connected to each other in series by connecting the positive electrode current collector plate 21 to the negative electrode current collector plate 22 by a plurality of conductive strips 4a, 4b and 4c.

In the battery module 120, the adjacent positive and negative electrode current collector plates 21 and 22 are connected to each other by three types of conductive strips 4a, 4b and 4c which are identical in the thickness and different in the width measured on a plane orthogonal to the direction of current flow. Of the areas when viewed from the top and the widths measured on a plane orthogonal to the direction of current flow of the conductive strips 4a, 4b and 4c, those of the conductive strip 4a are the smallest, and those of the conductive strip 4c are the largest. As such, the electrical resistance of the path on which the conductive strip 4a is arranged becomes higher than that of the path on which the conductive strip 4b or 4c is arranged.

The dot-dash line shown in FIGS. 7 and 8 is a virtual line drawn between the positive electrode lead 212 and the negative electrode lead 213. In the battery module 120, the arrangement of the conductive strips 4a, 4b and 4c is symmetric about the virtual line. Arranged on a path closest to the virtual line are the conductive strips 4a whose contact area with the current collector plates is the smallest and whose cross-sectional area measured on a plane orthogonal to the direction of current flow is the smallest. Arranged on a path farthest away from the virtual line are the conductive strips 4c whose contact area with the current collector plates is the largest and whose cross-sectional area measured on a plane orthogonal to the direction of current flow is the largest. Arranged therebetween are the conductive strips 4b whose contact area and cross-sectional area measured on a plane orthogonal to the direction of current flow are medium.

Current has a tendency to flow more in a path close to the virtual line shown in FIGS. 7 and 8. Accordingly, by arranging the conducive strips 4a on a path close to the virtual line among the paths provided symmetrically about the virtual line, the resistance of the path close to the virtual line becomes higher than that of any other path, and this prevents too much current from flowing therein. In the battery module 120, the conductive strips 4c are arranged on two paths away from the virtual line. By arranging the conducive strips 4c whose contact area with the current collector plates is large and whose cross-sectional area measured on a plane orthogonal to the direction of current flow is large, on a path away from the virtual line, more current is allowed to flow in the path away from the virtual line, along which current would otherwise be difficult to flow. As a result, current flows evenly through a plurality of the tubular battery cells 1, and load is evenly applied to all the tubular battery cells 1, and variations in battery life among the tubular battery cells 1 are reduced. Therefore, the battery module 120 can have a longer life.

Fourth Embodiment

Figure 9:
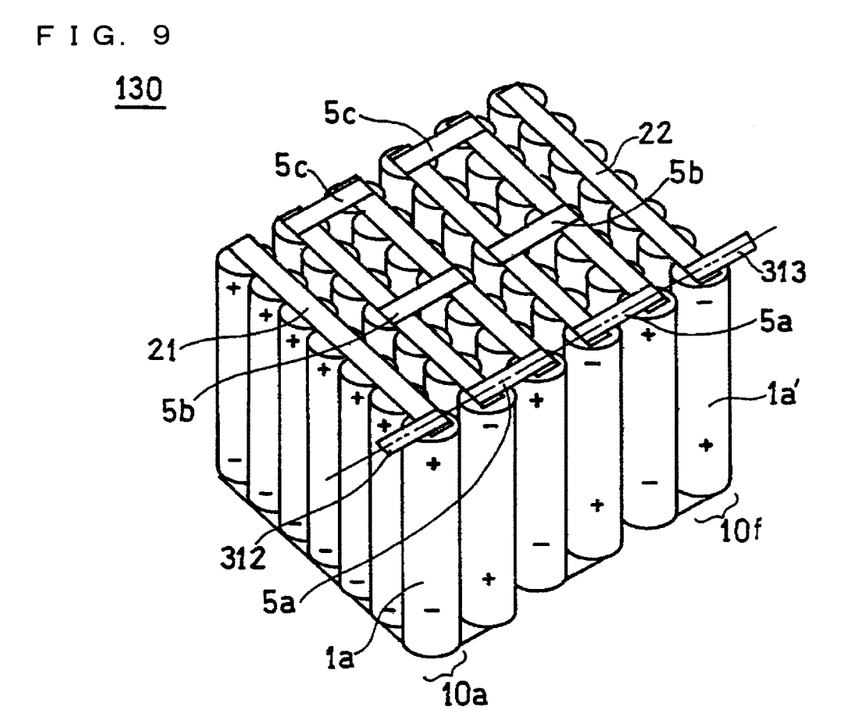
FIG. 9 A perspective schematic view of a battery module 130 of Forth Embodiment.
Figure 10:
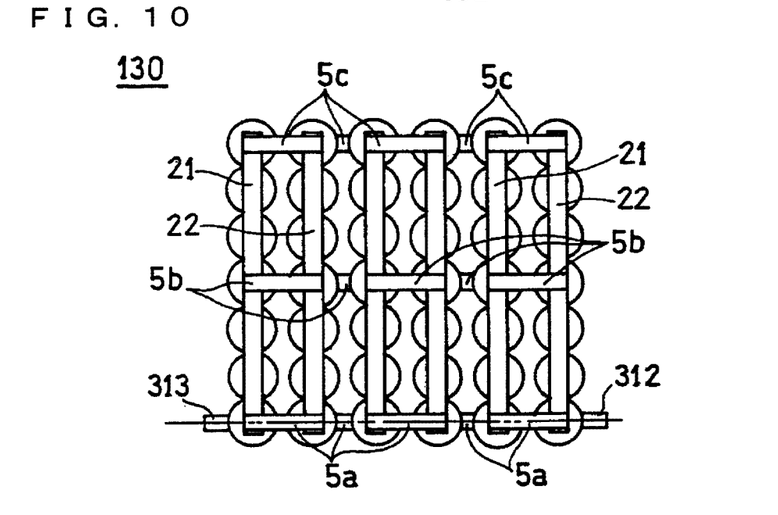
FIG. 10. A bottom schematic view of the battery module 130.

A battery module 130, which is still another embodiment of the battery module according to the present invention, is described with reference to FIGS. 9 and 10. FIG. 9 is a perspective schematic view of the battery module 130, and FIG. 10 is a bottom schematic view of the battery module 130. Here, the same component elements as those described with reference to FIGS. 1 to 4 in First Embodiment are denoted by the same reference numerals.

The battery module 130 is the same as the battery module 100, except that the type of conductive strip is changed.

In the battery module 130, a positive electrode lead 312 is connected to the positive electrode current collector plate 21 at a position near the tubular battery cell 1*a* in the first line of the first column of the battery group 10*a*, which is the end on the positive electrode side. This makes the current path from the positive electrode lead 312 to the tubular battery cell 1*a* shorter than any other current path from the positive electrode lead 312 to the tubular battery cell. A negative electrode lead 313 is connected to the negative electrode current collector plate 22 at a position near the tubular battery cell 1*a'* in the first line of the sixth column of the battery group 10*f*, which is the end on the negative electrode side. This makes the current path from the negative electrode lead 313 to the tubular battery cell 1*a'* shorter than any other current path from the negative electrode lead 313 to the tubular battery cell.

As shown in FIGS. 9 and 10, the adjacent battery groups are connected to each other in series by connecting the positive electrode current collector plate 21 to the negative electrode current collector plate 22 by a plurality of conductive strips 5*a*, 5*b* and 5*c*.

In the battery module 130, the adjacent positive and negative electrode current collector plates 21 and 22 are connected to each other by three types of conductive strips 5*a*, 5*b* and 5*c* which are different from one another in the thickness only. The conductive strips 5*a*, 5*b* and 5*c* have the same shape when viewed from the top. The thickness of the conductive strip 5*a* is the smallest, and that of the conductive strip 5*c* is the largest. As such, the electrical resistance of the path on which the conductive strip 5*a* is arranged becomes higher than that of the path on which the conductive strip 5*b* or 5*c* is arranged.

The dot-dash line shown in FIGS. 9 and 10 is a virtual line drawn between the positive electrode lead 312 and the negative electrode lead 313. The shortest path of current in the battery module 130 is a path along the virtual line. In the battery module 130, arranged on a path close to the virtual line are the conductive strips 5*a* whose thickness is the smallest, that is, whose cross-sectional area measured on a plane orthogonal to the direction of current flow is the smallest. Arranged on a path farthest away from the virtual line are the conductive strips 5*c* whose thickness is the largest, that is, whose cross-sectional area measured on a plane orthogonal to the direction of current flow is the largest. Arranged on a path therebetween are the conductive strips 5*b* whose thickness is medium.

Current to flow from the positive electrode lead to the negative electrode lead has a tendency to flow more in the shortest path. Accordingly, by arranging on a path close to the virtual line the conducive strips 5*a* whose thickness is the smallest, that is, whose cross-sectional area measured on a plane orthogonal to the direction of current flow is the smallest, the electrical resistance of the shortest path becomes higher than that of any other path, preventing too much current from flowing therein. In the battery module 130, the farther the conductive strips are away from the virtual line, the larger the thickness of the conductive strips is. By increasing the thickness of the conductive strips as the conductive strips are farther away from the virtual line, more current is allowed to flow in a path away from the virtual line, along which current would otherwise be difficult to flow. As a result, current flows evenly through a plurality of the tubular battery cells 1, load is evenly applied to all the tubular battery cells 1, and variations in battery life among the tubular battery cells 1 are reduced. Therefore, the battery module 130 can have a longer life.

Fifth Embodiment

Figure 11:
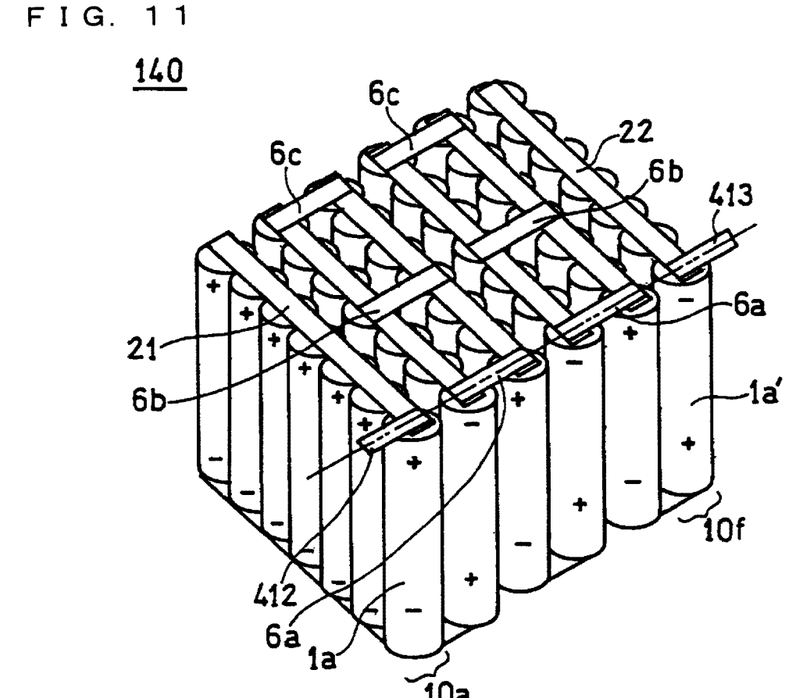
FIG. 11. A perspective schematic view of a battery module 140 of Fifth Embodiment.
Figure 12:
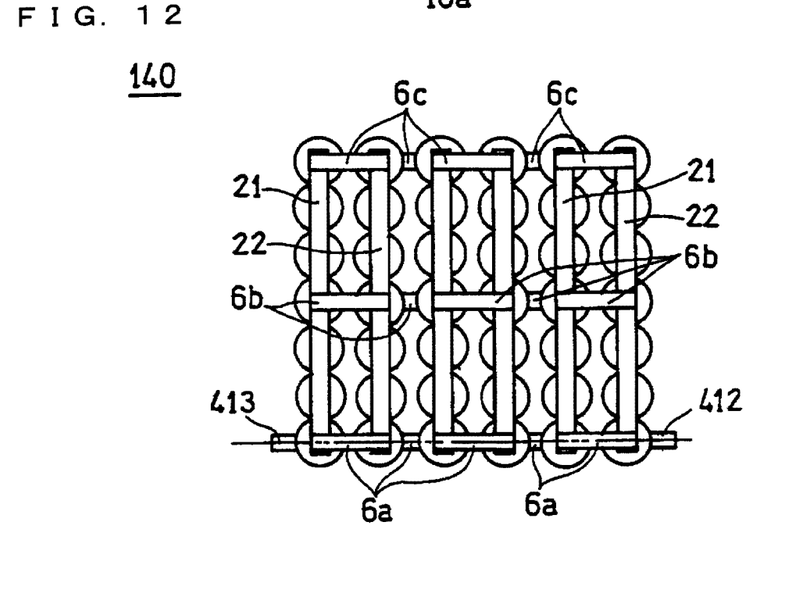
FIG. 12 A bottom schematic view of the battery module 140.

A battery module 140, which is yet another embodiment of the battery module according to the present invention, is described with reference to FIGS. 11 and 12. FIG. 11 is a perspective schematic view of the battery module 140, and FIG. 12 is a bottom schematic view of the battery module 140. Here, the same component elements as those described with reference to FIGS. 1 to 4 in First Embodiment are denoted by the same reference numerals.

The battery module 140 is the same as the battery module 100, except that the type of conductive strip is changed.

In the battery module 140, a positive electrode lead 412 is connected to the positive electrode current collector plate 21 at a position near the tubular battery cell 1*a* in the first line of the first column of the battery group 10*a*, which is the end on the positive electrode side. This makes the current path from the positive electrode lead 412 to the tubular battery cell 1*a* shorter than any other current path from the positive electrode lead 412 to the tubular battery cell. A negative electrode lead 413 is connected to the negative electrode current collector plate 22 at a position near the tubular battery cell 1*a'* in the first line of the sixth column of the battery group 10*f*, which is the end on the negative electrode side. This makes the current path from the negative electrode lead 413 to the tubular battery cell 1*a'* shorter than any other current path from the negative electrode lead 413 to the tubular battery cell.

As shown in FIGS. 11 and 12, the adjacent battery groups are connected to each other in series by connecting the positive electrode current collector plate 21 to the negative electrode current collector plate 22 by a plurality of conductive strips 6*a*, 6*b* and 6*c*.

In the battery module 140, the adjacent positive and negative electrode current collector plates 21 and 22 are connected to each other by three types of conductive strips 6*a*, 6*b* and 6*c* which are made of electrically conductive materials different from one another in specific resistance only. The conductive strips 6*a*, 6*b* and 6*c* are identical in the shape and different from one another in the specific resistance value only. The specific resistance vale of the conductive strip 6*a* is the highest, and that of the conductive strip 6*c* is the lowest. As such, the electrical resistance of the path on which the conductive strip 6*a* is arranged becomes higher than that of the path on which the conductive strip 6*b* or 6*c* is arranged.

The dot-dash line shown in FIGS. 11 and 12 is a virtual line drawn between the positive electrode lead 412 and the negative electrode lead 413. The shortest path of current in the battery module 140 is a path along the virtual line. In the battery module 140, arranged on a path close to the virtual line are the conductive strips 6*a* whose specific resistance value is the highest. Arranged on a path farthest away from the virtual line are the conductive strips 6*c* whose specific resistance is the lowest. Arranged on a path therebetween are the conductive strips 6b whose specific resistance value is medium.

Current to flow from the positive electrode lead to the negative electrode lead is more likely to flow in the shortest path. Accordingly, by arranging on a path close to the virtual line the conductive strips 6a whose specific resistance value is the highest, the electrical resistance of the shortest path becomes higher than that of any other path, preventing too much current from flowing therein. In the battery module 140, the farther the conductive strips are away from the virtual line, the higher the specific resistance value of the conductive strips is. By decreasing the specific resistance value of the conductive strips as the conductive strips are farther away from the virtual line, more current is allowed to flow in a path away from the virtual line, along which current would otherwise be difficult to flow. As a result, current flows evenly through a plurality of the tubular battery cells 1, load is evenly applied to all the tubular battery cells 1, and variations in battery life among the tubular battery cells 1 are reduced. Therefore, the battery module 140 can have a longer life.

In the battery modules described in the above embodiments, the charge/discharge current flows evenly though a plurality of the tubular battery cells. As a result, variations in deterioration among the tubular battery cells are reduced, thus providing a longer life.

INDUSTRIAL APPLICABILITY

The battery module of the present invention is applicable to transportation equipment such as electric vehicles, hybrid electric vehicles, fuel cell-powered vehicles, and plug-in HEVs, electric powered tools, vacuum cleaners, machining equipment such as robots, power storage equipment, and the like. The battery module of the present invention can be used as a power source for electric equipment and electronic equipment, and is particularly useful as a power source for portable electronic equipment. Examples of portable electronic equipment include personal computers, cellular phones, mobile devices, personal digital assistants, portable game machines, and video cameras.

REFERENCE SIGNS LIST 1 (1a, 1b, 1c, 1d, 1e, 1f, 1g) Tubular battery cell
2 (2a, 2b, 2c) Conductive strip
3 (3a, 3b) Conductive strip
4 (4a, 4b, 4c) Conductive strip
5 (5a, 5b, 5c) Conductive strip
6 (6a, 6b, 6c) Conductive strip
111 Conductive strip
10 (10a, 10b, 10c, 10d, 10e, 10f) Battery group
12, 112, 212, 312, 412 Positive electrode lead
13, 113, 213, 313, 413 Negative electrode lead
21 Positive electrode current collector plate
22 Negative electrode current collector plate
100, 110, 120, 130, 140, 200 Battery module

The invention claimed is:

1. A battery module comprising;
a plurality of battery groups being connected in series and each comprising a plurality of battery cells connected in parallel, wherein:
a positive electrode terminal and a negative electrode terminal are provided,
the battery groups are connected to each other by a plurality of electrically conductive strips, and
an electrical resistance value of the conductive strip arranged at a position near a virtual line drawn between the positive electrode terminal and the negative electrode terminal is high, and an electrical resistance value of the conductive strip arranged at a position other than the position near the virtual line is low, the electrical resistance value being measured in a direction of charge and discharge current flow.

2. The battery module in accordance with claim 1, wherein the farther the conductive strip is away from the virtual line, the lower the electrical resistance value of the conductive strip measured in the direction of charge and discharge current flow is.

3. The battery module in accordance with claim 1, wherein:
the battery cells each comprise a tubular battery cell;
positive electrodes of the tubular battery cells of each of the battery groups are connected to each other by a positive electrode current collector plate, and negative electrodes of the tubular battery cells of each of the battery groups are connected to each other by a negative electrode current collector plate; and
the positive electrode terminal is connected to one of the positive electrode current collector plates, and the negative electrode terminal is connected to one of the negative electrode current collector plates.

4. The battery module in accordance with claim 3, wherein:
in each of the battery groups, the tubular battery cells are linearly arranged upright and connected in parallel to each other.

5. The battery module in accordance with claim 1, wherein the farther the conductive strip is away from the virtual line, the larger a cross sectional area of the conductive strip measured on a cross section perpendicular to the direction of charge and discharge current flow is.

6. The battery module in accordance with claim 5, wherein the conductive strips have the same thickness, and
the farther the conductive strip is away from the virtual line, the larger an area of the conductive strip when viewed from the top is.

7. The battery module in accordance with claim 5, wherein the conductive strips have the same area when viewed from the top, and
the farther the conductive strip is away from the virtual line, the larger a thickness of the conductive strip is.

8. The battery module in accordance with claim 5, wherein the conductive strips have the same shape, and
the farther the conductive strip is away from the virtual line, the lower a specific resistance value of the conductive strip is.

* * * * *